United States Patent
Ohlig et al.

(10) Patent No.: US 11,054,023 B2
(45) Date of Patent: Jul. 6, 2021

(54) PARKING BRAKE SYSTEM FOR A MOTORIZED VEHICLE AND MOTORIZED VEHICLE

(71) Applicant: ZF Active Safety GmbH, Koblenz (DE)

(72) Inventors: Benedikt Ohlig, Vallendar (DE); Matthias Fuchs, Koblenz (DE); Erwin Michels, Kail (DE)

(73) Assignee: ZF Active Safety GmbH, Koblenz (DE)

( * ) Notice: Subject to any disclaimer, the term of this patent is extended or adjusted under 35 U.S.C. 154(b) by 69 days.

(21) Appl. No.: 16/604,401

(22) PCT Filed: May 18, 2018

(86) PCT No.: PCT/DE2018/100482
§ 371 (c)(1),
(2) Date: Oct. 10, 2019

(87) PCT Pub. No.: WO2018/210380
PCT Pub. Date: Nov. 22, 2018

(65) Prior Publication Data
US 2020/0124168 A1    Apr. 23, 2020

(30) Foreign Application Priority Data
May 19, 2017   (DE) .......................... 102017110941.2

(51) Int. Cl.
*F16H 57/10*    (2006.01)
*F16H 61/00*    (2006.01)
(Continued)

(52) U.S. Cl.
CPC .......... *F16H 61/0059* (2013.01); *B60T 1/005* (2013.01); *B60T 1/062* (2013.01);
(Continued)

(58) Field of Classification Search
CPC ...... F16H 61/0059; F16H 48/08; F16H 48/10; F16H 48/38; F16H 57/037; F16H 57/10;
(Continued)

(56) References Cited

U.S. PATENT DOCUMENTS

| 3,517,572 A * | 6/1970 | Schmid .................... B60T 1/062 475/240 |
| 3,814,222 A * | 6/1974 | Koivunen ............... F16H 48/11 192/219.5 |
| 3,915,267 A * | 10/1975 | Shea ....................... F16H 48/08 192/217.3 |
| 8,651,991 B1 | 2/2014 | Sten et al. |
| 2006/0240931 A1 | 10/2006 | Habel |

(Continued)

FOREIGN PATENT DOCUMENTS

| CN | 203681266 U | 7/2014 |
| CN | 204749860 U | 11/2015 |

(Continued)

*Primary Examiner* — Justin Holmes
(74) *Attorney, Agent, or Firm* — Robert James Harwood (57) ABSTRACT

The present disclosure relates to a parking brake system for a motorized vehicle, which uses a differential. Furthermore, the present disclosure relates to a differential for an automotive drive, which can be used by such a parking brake. The differential comprises a transmission housing, a transmission input, two transmission output shafts, and a rotary transmission for distributing performance effective on the transmission output shafts at the transmission input, the rotary transmission comprising at least four transmission elements, of which two transmission elements are configured as a central gear, at least one transmission element as a rotary gear, and a transmission element as a rotary gear carrier, wherein the rotary gear carrier is coupled with the transmission input and one of the central gears each is coupled with one of the transmission output shafts.

9 Claims, 3 Drawing Sheets

(51) Int. Cl.
*B60T 1/00* (2006.01)
*B60T 1/06* (2006.01)
*F16H 48/08* (2006.01)
*F16H 48/10* (2012.01)
*F16H 48/38* (2012.01)
*F16H 57/037* (2012.01)
*F16H 63/34* (2006.01)

(52) U.S. Cl.
CPC ............. *F16H 48/08* (2013.01); *F16H 48/10* (2013.01); *F16H 48/38* (2013.01); *F16H 57/037* (2013.01); *F16H 57/10* (2013.01); *F16H 63/3466* (2013.01)

(58) Field of Classification Search
CPC .. F16H 63/3466; F16H 63/3416; B60T 1/005; B60T 1/062
See application file for complete search history.

(56) References Cited

U.S. PATENT DOCUMENTS

| | | |
|---|---|---|
| 2013/0116087 A1 | 5/2013 | Ichikawa et al. |
| 2013/0313066 A1 | 11/2013 | Takahashi et al. |

FOREIGN PATENT DOCUMENTS

| | | |
|---|---|---|
| DE | 20310256 U1 | 11/2004 |
| DE | 10319684 A1 | 12/2004 |
| DE | 10327458 A1 | 1/2005 |
| DE | 102004024086 A1 | 12/2005 |
| DE | 102007043211 A1 | 3/2009 |
| DE | 102009000712 A1 | 8/2010 |
| DE | 102011079618 A1 | 1/2013 |
| DE | 102014201255 A1 | 7/2015 |
| DE | 102015205101 A1 | 12/2015 |
| WO | 2012095134 A1 | 7/2012 |

* cited by examiner

PARKING BRAKE SYSTEM FOR A MOTORIZED VEHICLE AND MOTORIZED VEHICLE

CROSS-REFERENCE TO RELATED APPLICATION

This application is a national stage of International Application No. PCT/DE2018/100482, filed May 18, 2018, the disclosure of which is incorporated herein by reference in its entirety, and which claimed priority to German Patent Application No. 102017110941.2, filed 19 May 2017, the disclosure of which is incorporated herein by reference in its entirety.

TECHNICAL FIELD

The present disclosure relates to a parking brake system for a motorized vehicle. Furthermore, the present disclosure relates to a motorized vehicle with such a parking brake system.

Parking brakes, also called emergency brakes, are used in motorized vehicles, for example. They are generally provided to keep the motorized vehicle at standstill, for example, if the motorized vehicle is stopped on an inclined roadway. The parking brakes are also generally designed to keep the motorized vehicle at standstill for a longer period of time, for example, in the absence of the driver.

The parking brakes are usually applied to an axle on the wheels of the motorized vehicle and are implemented there in the area of the wheel hubs, for example, as a drum brake or a disk brake. Consequently, a brake for parking braking of the wheel is provided for each wheel. When drum brakes are used as parking brakes, parts of the service brake are frequently used jointly, for example, when at a service brake designed as a disk brake the inner peripheral surface of the brake disc pot serves as a friction surface for the brake pads of the drum brake. In this use case, a separate brake for parking braking of the wheel is also provided for each wheel. Therefore, it is an object of the present disclosure to suggest at least one possibility of allowing a parking braking with few integral parts.

This object is solved by a parking brake system, which has the characteristics of claim 14 and uses a differential with the characteristics of claim 1. Furthermore, the object is solved by suggesting a motorized vehicle with the characteristics of claim 16. Advantageous embodiments and/or configurations and/or aspects of the present disclosure arise from the subclaims, the following description, and the figures.

A basic parking brake system, e.g. for a motorized vehicle, uses a differential. A possible embodiment of a differential, which can be used by the parking brake system, is a differential for an automotive drive, comprising a transmission housing, a transmission input, two transmission output shafts, and a rotary transmission for the distribution of a propulsion power at the transmission input affecting the transmission output shafts.

The transmission has been specifically designed to be input-connected to a drive machine, such as an internal combustion engine or an electric motor. For example, the transmission has at least one connecting element or coupling element for this purpose. Specifically, the transmission output shafts are configured for each being input-connected to a vehicle wheel. For example, the transmission output shafts have each at least one connecting element or coupling element for this purpose. Specifically, the transmission housing is configured to be built into the drive train, for example, of a motorized vehicle, specifically to be firmly fixed to a housing with the drive train and/or to be fixed to a housing with a vehicle chassis. For example, the transmission housing has at least one connecting element or coupling element for this purpose.

The rotary transmission has at least four transmission elements, of which two transmission elements are configured as the central gear, at least one transmission element as a rotary gear, and one transmission element as a rotary gear carrier. The rotary gear carrier is coupled, for example, non-rotatably connected or operatively connected via a transmission stage, with the transmission input and one of the central gears respectively. Furthermore, at least one rotary gear is engaged with the central gears and is pivotably mounted to the rotary gear carrier. Specifically, the rotary gear carrier is pivotably supported against at least one of the transmission output shafts.

With the differential, at least one brake element for a parking brake provided, through which two of the transmission elements can be operatively connected, specifically directly or indirectly non-rotatably connected or coupled, to the transmission housing. Specifically, the at least one brake element is configured to operatively connect two of the transmission elements or the two of the transmission elements to the transmission housing. This way, the differential has additionally, aside from the function as a differential, a parking brake function or an emergency brake function with regard to the transmission output shafts, which are operatively connected to the couplable transmission elements fixed to a housing. The parking brake function or emergency brake function specifically means the locking of at least one of the transmission output shafts by frictional engagement and/or positive engagement to, for example, keep a motorized vehicle at standstill. Specifically, this is to prevent the vehicle from unintentionally rolling away, even if the vehicle is parked on an inclined roadway. The parking braking can basically also be used for emergency braking of the vehicle.

A parking brake function with few integral parts is to be implemented by the at least one brake element, specifically, if the one brake element is provided as the only brake element. With a motorized vehicle using the said differential, the locking wheel brakes typically allocated to each vehicle wheel can be saved. Basically, the differential can also have two brake elements, of which one brake element is used to operatively connect, specifically to non-rotatably connect, the one transmission element to the transmission housing and the other brake element is used to operatively connect, specifically to non-rotatably connect, the other transmission element to the transmission housing as well.

It is the obvious choice that the differential is configured to operatively connect, specifically non-rotatably connect, the two transmission elements together to the transmission housing. Specifically, the brake element is configured to affect both of the transmission elements at the same time or together in a locking manner. This will enable that a motorized vehicle equipped with a differential can be kept at standstill, if the motorized vehicle is on an inclined roadway and the friction value of the road surface is different in the area of the vehicle wheels, since both transmission output shafts are locked.

Depending on the embodiment of the differential, two different transmission elements of the four transmission elements of the rotary transmission can be used to achieve a locking by means of the brake element. For example, the differential is configured in one embodiment to operatively connect, specifically non-rotatably connect, one of the transmission output shafts and the rotary gear carrier to the transmission housing by the brake element. Specifically, the one transmission output shaft can be operatively connected directly or indirectly to the transmission housing via the respective central gear.

In another embodiment, the differential is configured to operatively connect, specifically non-rotatably connect one of the transmission output shafts and the at least one rotary gear to the transmission housing by the brake element. Specifically, the one transmission output shaft can be operatively connected, specifically non-rotatably connected, directly or indirectly to the transmission housing, for example via the respective central gear. In yet another embodiment, the differential is configured to operatively connect, specifically non-rotatably connect, both of the transmission output shafts to the transmission housing by the brake element. Specifically, the respective transmission output shaft can be operatively connected, specifically non-rotatably connected, directly or indirectly to the transmission housing, for example via the respective central gear. In yet another embodiment, the differential is configured to operatively connect, specifically non-rotatably connect, the rotary gear carrier and the at least one rotary gear to the transmission housing by the brake element.

A configuration of the differential is that the brake element is allocated within the transmission housing. This will use the transmission housing as enclosure for the brake element. This measure protects the brake element from external forces, for example, mechanical and/or chemical forces. This way, possible unstable conditions in regard to the braking action are counteracted, which may occur due to decay and/or non-use over a longer period of time of the parking brake system.

Another configuration of the differential is that the brake element is a frictionally engaged brake element. For example, the brake element is a friction brake or an integral part of a friction brake. The friction brake can be a disk brake or a drum brake. If a disk brake is used, it can be configured as a fixed-caliper disk brake or floating-caliper disk brake. In principle, each Kind of friction brake can be used.

A possible embodiment is that the brake element has at least a friction surface non-rotatably allocated with regard to the transmission housing and both of the transmission elements operatively connectable to the transmission housing each have a counter friction surface, wherein the counter friction surface of the other transmission element is configured at a material section allocated within and concentrically to the ring structure. For example, the transmission element with the ring structure is the rotary gear carrier, which can be configured in a cup-shape or a kind of cage. For example, the transmission element with the material section is one of the transmission output shafts. The material section can be configured as a type of brake disk or as a brake disk. The material section and/or the ring structure can be moulded or non-rotatably connected to their respective transmission element.

It is an obvious choice that the friction surface of the brake element can be brought into friction contact together against both counter friction surfaces, for example, by overlapping the friction surface with the counter friction surfaces in a radial direction and, for example, by being able to move the friction surface or counter friction surfaces in an axial direction. This way, the friction brake can be implemented in a technically simple manner.

Furthermore, it is an obvious choice that the differential has a drive for actuating the brake element. Specifically, the drive is fixed to a housing with regard to the transmission housing. This way, the drive is allocated to the differential. For example, the drive forms a preassembled modular unit together with the differential. It is the obvious choice that the drive is an electromotive drive with a secondary single-step or multi-step transmission unit, if necessary. This way, the differential is suitable for running in an electric or an electromechanical parking brake system (EPB). For example, the drive comprises a controllable and/or adjustable electric motor, by which the braking power affecting the second brake element is variable, specifically continuously variable. Such a drive is the obvious choice, if the brake element is a frictionally engaged brake element or friction brake. Alternatively, a mechanical, hydraulic, electrohydraulic, or pneumatic drive can be provided for actuating the brake element, which is, for example, fixed to a housing with regard to the housing of the transmission housing.

Another configuration of the differential has at least one additional brake element, through which two transmission elements can be operatively connected, specifically non-rotatably connected, to the transmission housing. Specifically, the at least one additional brake element is configured to operatively connect, specifically non-rotatably connect, two of the transmission elements or both of the transmission elements to the transmission housing. Specifically, the additional brake element is configured to be used as a redundancy to the brake element and/or to increase the braking power. The additional brake element enables a full redundancy of the parking brake function, which is needed for highly automated driving of a motorized vehicle. The additional brake element also allows for a total braking power, which is configured by the braking power of the brake element and the additional brake element and, consequently, causes an increase in the brake effect. Both transmission elements operatively connectable to the transmission housing by means of the additional brake element can be those transmission elements, which can be locked against the transmission housing by the brake element. Alternatively, others of the transmission elements of the rotary transmission can be used.

An additional drive can be provided for actuating the additional brake element, which is, for example, fixed to a housing with regard to the housing of the transmission housing. The drive can be an electromotive drive or a mechanical drive or a hydraulic drive or a pneumatic drive. Alternatively, the drive for actuating the brake element can be used as a drive for the additional brake element. The drive for the brake element can be configured that it actuates the brake element and the additional brake element at the same time or the drive can optionally actuate the brake element or the additional brake element.

According to another embodiment, the differential is a spur gear differential. The spur gear differential can have two rotary gears, which are non-rotatably connected to a common shaft rotatably mounted to the rotary gear carrier and arranged parallel to the axis with regard to one of the transmission output shafts, wherein one of the rotary gears meshes with one of the central gears and the other rotary gear is operatively connected with the other central gear with the interposition of an intermediate gear. For example, both of the rotary gears and the central gears are each configured as spur gears. Alternatively, only one of the rotary gears can be configured as a spur gear as well as the central gear mating with them can be configured as a spur gear, and the other rotary gear and the corresponding central gear can be present in another embodiment, for example, configured as a bevel gear.

According to another embodiment, the differential is a bevel gear differential. The spur gear differential can have at least one, specifically two rotary gears, which each are non-rotatably connected to a separate shaft rotatably mounted to a rotary gear carrier and transversely arranged to one of the transmission output shafts, wherein each of the rotary gears meshes with one of the central gears. For example, both of the rotary gears and the central gears are each configured as a bevel gear. Alternatively, only one of the rotary gears can be configured as a bevel gear as well as the central gear mating with them can be configured as a bevel gear, and the other rotary gear and the corresponding central gear can be present in another embodiment, for example, configured as a spur gear.

According to one configuration, the differential can be an axle differential for a motorized vehicle. The axle differential can be a front axle differential or a rear axle differential.

A possible embodiment of the parking brake system comprises an electronic control device for controlling and/or adjusting the drive of the differential, as described above, specifically for controlling and/or adjusting the electromotive drive, as described above, wherein the control device and the drive are configured for setting, specifically continuously adjusting, a braking force actuated by the brake element of the differential according to one or more set values. For example, the set values include or are based on a information about the inclination of the roadway and/or the friction value of the roadway surface and/or about the current driving or stationary state of the motorized vehicle and/or about parameters of the motorized vehicle, such as for example the load condition. Provided that the brake element is a friction brake, a controlled opening or closing of the brake element and, consequently, a regulation of the braking force is thereby possible, for example, for a comfortable start-up of the motorized vehicle, specifically on an inclined roadway.

According to another aspect of the present disclosure, a motorized vehicle is provided, which comprises at least one of the embodiments described above and/or configurations of the parking brake system with at least one of the embodiments described above and/or configurations of the differential. For example, the differential is an axle differential of the front axle or the rear axle of the motorized vehicle. The transmission input of the differential is input-connected to a drive machine and the transmission output shafts of the differential are each in-put connected to a vehicle wheel. The differential can be a differential gear or a transfer gear.

According to another aspect of the present disclosure, the use of at least one of the embodiments described above and/or configurations of the differential is provided to perform parking braking action with the motorized vehicle, specifically with the motorized vehicle described above.

According to another aspect of the present disclosure, a process for performing parking braking action with the motorized vehicle, specifically with the motorized vehicle described above, is provided, wherein the motorized vehicle comprises at least one of the embodiments described above and/or configurations of the differential and/or at least one embodiment described above and/or configurations of the parking brake system. During the process, the at least one brake element of the differential is actuated for a parking braking.

BRIEF DESCRIPTION OF THE DRAWINGS

Additional details and characteristics of the present disclosure stem from the following description of several exemplary embodiments based on the drawing.

It is displayed in.

DETAILED DESCRIPTION

Figure 1:
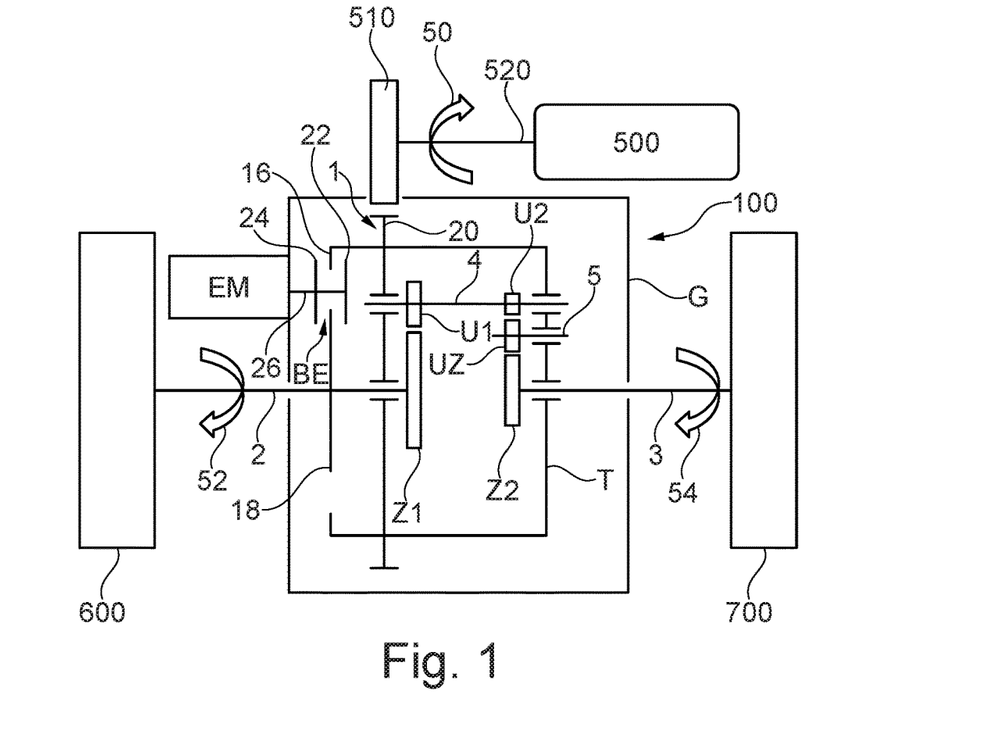
FIG. 1 a schematic view of a drive train for a motorized vehicle with a possible embodiment of a differential and of a differential using the parking brake system in an open position of a brake element, FIG. 2 the drive train according to FIG. 1, when the brake element is in a closed position, FIG. 3 a schematic view of a drive train for a motorized vehicle with another possible embodiment of a differential and of a differential using the parking brake system in an open position of a brake element, FIG. 4 the drive train according to FIG. 3, when the brake element is in a closed position, and FIG. 5 a schematic view of a drive train for a motorized vehicle with yet another possible embodiment of a differential and of a differential using the parking brake system in an open position of a brake element.

FIG. 1 shows as an example and in a simplified way a drive train for a motorized vehicle, which uses a possible embodiment of a differential 100. The differential 100 is here an axle differential. and can form a rear axle differential or a front axle differential. The differential 100 comprises a transmission housing G, a transmission input 1, two transmission output shafts 2, 3, and a rotary transmission UG for distribution of a propulsion power affecting the transmission input 1 to the transmission output shafts 2, 3, for example, for equalization of the rpm difference between the transmission output shafts 2, 3, for example, when the motorized vehicle is cornering.

For example, the differential 100 is input-connected to a drive machine 500 at its transmission input 1 and a vehicle axle, for example, is input-connected to vehicle wheels 600 and 700 at its transmission output shafts 2 and 3. The drive machine 500 can be an internal combustion engine or an electric motor or another drive machine for moving the motorized vehicle. For transmission of power of the drive machine 500 to the transmission input 1, for example, a spur gear 510 is provided, which is driven or drivable by a output shaft 520 of the drive machine 500 and affects the transmission input 1. For example, the transmission input 1 has a mating gear 20, which is also configured as a spur gear, for example, and meshes with the spur clear 110. Arrows 50, 52, and 54 point at the directions of rotation of the output shaft 520 of the drive machine 500 and the vehicle wheels 600, 700 in a driving state.

The drive machine 500 can be provided as a unit with a (not shown in FIG. 1) transmission. The transmission is specifically configured to cause a single transmission ratio or different transmission ratios between its input or input shaft and its output or output shaft or pinion shaft. The transmission can be configured for manual operation or for an automated operation. For example, the transmission is a manual transmission or an automated transmission or a converter-automated transmission or a continuously variable transmission or a semiautomatic transmission or a transmission with a converter clutch.

Preferably, the rotary transmission has at least four transmission elements, of which two transmission elements are configured as a central clear Z1 or Z2, at least one, preferably two transmission elements as a rotary gear U1 or U2, and one transmission element as a rotary gear carrier T. The rotary gear carrier T is coupled with the transmission input 1. For this reason, the mating gear 20 is non-rotatably connected or moulded to the rotary clear carrier T, for example. Preferably, one of the central gears Z1, Z2 is each coupled with, specifically non-rotatably connected, to one of the transmission output shafts 2, 3. Preferably, the rotary gear U1 is engaged with the central gear Z1 and the rotary gear U2 with the central gear Z2, wherein the rotary gears U1, U2 are each rotatably mounted to the rotary gear carrier T. Preferably, the rotary gear carrier T in turn is pivotably resting against at least one of the transmission output shafts 2, 3, for example, against both of the transmission output shaft 2, 3.

Preferably, the rotary gears U1, U2 are allocated, specifically non-rotatably coupled to a common shaft 4, and the shaft 4 is pivotably attached to the rotary gear carrier T. Preferably, the shaft 4 is parallel to the axis to at least one, preferably both transmission output shafts 2, 3. Preferably, the transmission output shafts 2, 3 are coaxial with regard to a common axle, preferably allocated to a central axis of the differential 100. Preferably, an intermediate gear ZU is interposed between one of the rotary gears U1, U2 and the corresponding central gear Z1 or Z2 to cause reversing the direction of the rotation between the one rotary gear U2 and the corresponding central gear Z2 so that the transmission output shafts 2, 3 are rotating in the same direction. Preferably, the intermediate gear ZU is allocated to a shaft 5, preferably non-rotatably coupled to it, which is allocated between the shaft 5 and the corresponding transmission output shaft 3.

The differential 100 is configured for use in connection with a parking brake system. For this reason, the differential 100 has a brake element BE, through which two of the transmission elements can be operatively connected, specifically non-rotatably connected, to the transmission housing G. Preferably, the brake element BE is allocated within the transmission housing G and is protected from external forces by the transmission housing G acting as an enclosure.

In the embodiment according to FIG. 1, the transmission element, which are operatively connectable to the transmission housing G by the brake element BE, on one hand one of the rotary gear carriers T and on the other one of the transmission output shafts 2 and 3, for example, the transmission output shaft 2. Preferably, the brake element BE can be a frictionally engaged brake element, for example, as part of a friction brake, specifically a fixed-caliper disk brake or a floating-caliper disk brake. In addition, the brake element BE can have at least one friction surface non-rotatably allocated with regard to the transmission housing G, wherein a counter friction surface is allocated each to the rotary gear carrier T and the transmission output shaft 2. By friction contact of the friction surface against the counter friction surfaces, a deceleration and/or locking of the rotary gear carrier T and the transmission output shaft 2 against the transmission housing G is achieved.

The counter friction surface allocated to the rotary gear carrier T, for example, is a ring structure 16. The ring structure 16 can be non-rotatably connected or moulded to the rotary gear carrier T. For this reason, the rotary gear carrier T is preferably configured cup-shaped and/or in a type of cage. The counter friction surface allocated to the transmission output shaft 2 is preferably configured at a material section 18, which is non-rotatably connected or moulded to the transmission output shaft 2. Preferably, the material section 18 is configured disk-shaped, for example, like a brake disk.

For example, the friction surface can be moved in an axial direction and/or parallel to the axis with regard to at least one of the transmission output shafts 2, 3 by configuring the friction surface, for example, at an axially moveable piston 22. Preferably, the friction surface is with the counter friction surfaces in a radial direction, for example, with regard to the transmission output shaft 2, overlapping so that there is contact of the counter friction surfaces, if the friction surface is moved in an axial direction. In addition, an additional friction surface can be provided, which, for example, is configured at another piston 24. The additional friction surface can be allocated opposite to the friction surface so that the material section 18 and the ring structure 16 are located between the friction surface and the additional friction surface and can be brought into friction contact against the ring structure 16 and the material section 18.

Preferably, a drive, specifically an electromotive drive EM, is provided for actuating the brake element BE. Preferably, the drive EM is motion-coupled with the brake element BE, specifically with a friction surface, by means of a transmission element 26 so that the at least one friction surface can be axially moved by the drive EM. The drive EM is fixed to a housing with regard to the transmission housing G, for example, attached on the outside of the transmission housing G. Preferably, the drive EM is a controllable and/or adjustable electric motor, by which the braking power affecting the brake element BE is variable, specifically continuously variable.

For example, it is provided that the parking brake system using the differential 100 has an electronic control device, by means of which the drive EM can be controlled. Preferably, the control device and the drive EM are then configured for setting a braking power exerted by the brake element BE of the differential 100 according to one or more set values. By means of the control device, a specific proportion of braking power, for example, in its amplitude and/or over a predetermined period of time, can be specifically set so that a controlled braking of the motorized vehicle, for example, when decelerating to a standstill or when starting from the standstill, is enabled.

In FIG. 1, the brake element BE is in an open position. In this state, the brake element BE does not develop any braking effect on the transmission output shafts 2 and 3. The vehicle wheels 600 and 700 are driven via the transmission output shafts 2 and 3 due to the drive connection by the drive machine 500, which is switched to driving.

Figure 2:
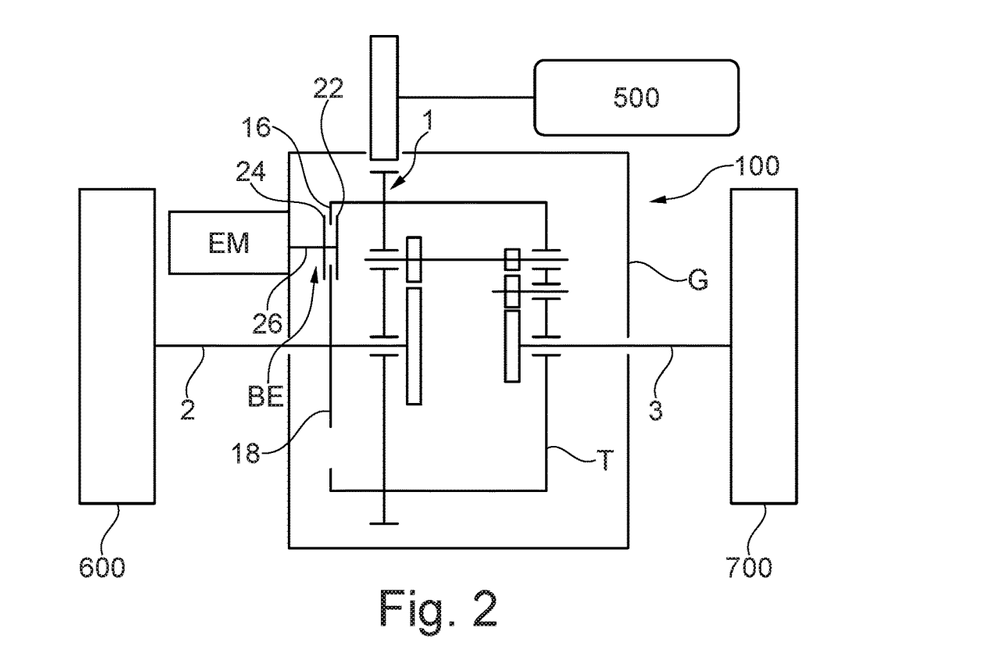

FIG. 2 shows the drive train with the differential 100 in a state, where the brake element BE is in a closed position, i.e. the parking brake was activated and the electromotive drive EM was actuated. The brake element BE is with its friction surface in friction contact against the at least one counter friction surface, because the rotary gear carrier T and the transmission output shaft 2 are operatively connected to the housing G. In FIG. 2, stillstand has already be achieved by means of the brake element BE, because the rotary gear carrier T and the transmission output shaft 2 are tightly connected opposite from the transmission housing G.

Due to the operative connection of the rotary gear carrier T to the transmission output shaft 3, the transmission output shaft 3 is also locked when the brake element BE is in the closed position so that both transmission output shafts 2 and 3 and both of the vehicle wheels 600 and 700 are gripped by the brake element BE. In this state, the drive machine 500 is preferably disconnected from the drive train. Alternatively, a parking lock operate via an automatic transmission interconnected to the drive machine and the differential 100 so that the rotary gear carrier T is also non-rotatably fixed via the transmission input 1.

With the differential 100 in FIGS. 1 and 2, the rotary transmission is a transmission with spur gears. Preferably, the central gears Z1 and Z2 each are configured as a spur gear and also the rotary gears U1 and U2 each as a spur gear. In addition, the intermediate gear UZ is also preferably configured as a spur gear. For this reason, the shafts 4 and 5 are preferably allocated to one of the transmission output shafts 2 and 3 parallel to the axis.

Figure 3:
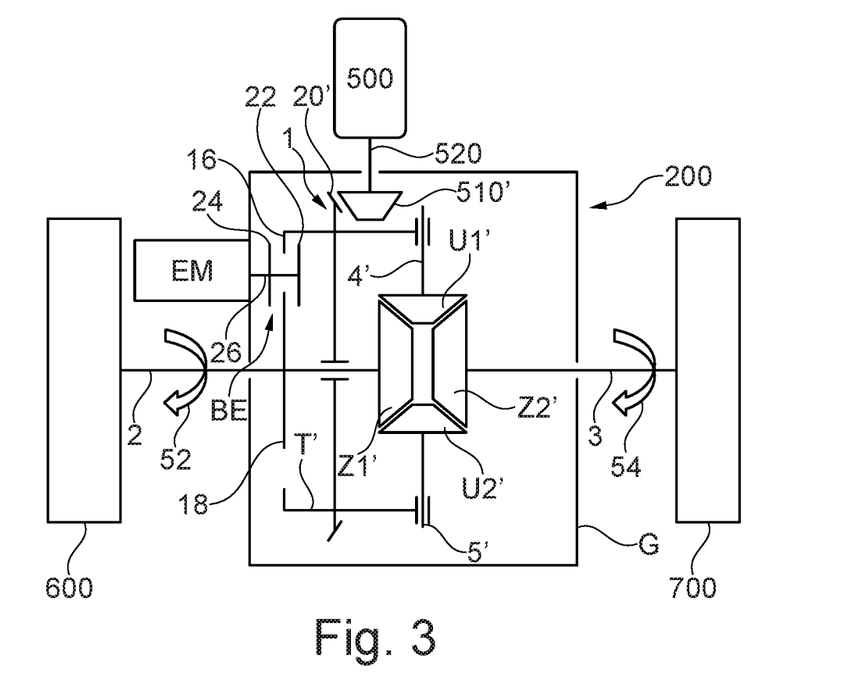

FIG. 3 shows the drive train with another possible embodiment of the differential 200, which is configured for use in connection with a parking brake system. The differential 200 differs from the differential 100 of FIGS. 1 and 2 in that the rotary transmission is a bevel-gear transmission. The bevel-gear transmission has at least four transmission elements, of which two transmission elements are configured as a central gear Z1', Z2', at least one, preferably two transmission elements as a rotary gear U1' or U2', and one transmission element as a rotary gear carrier T'. Preferably, the central dears Z1' and Z2' each are then configured as a bevel gear and also the rotary gears U1' and U2' each as a bevel gear.

The rotary gear carrier T' is non-rotatably coupled with the transmission input 1. Preferably, one of the central gears Z1', Z2' is each non-rotatably coupled with one of the transmission output shafts 2, 3. Furthermore, the rotary dears U1", U2' are rotatably mounted to the rotary gear carrier T' and are engaged with the respectively corresponding central gear Z1' or Z2'. Preferably, the rotary gear carrier T' in turn is pivotably resting against at least one of the transmission output shafts 2, 3, for example, against the transmission output shaft 2. Preferably, the rotary gears U1', U2' each are non-rotatably connected to a separate shaft 4' or 5' rotatably mounted to the rotary gear carrier T' and transversely arranged to one of the transmission output shafts 2, 3.

With the differential 200, the drive machine 500 is operatively connected or operatively connectable to the transmission input 1 via its output shaft 520. There, the output shaft 520 is non-rotatably connected to the bevel gear 510 and the transmission input 1 has a mating gear 20', which is also configured as a bevel gear. This wat, the output shaft 520 allocated transversely to at least one of the transmission output shafts 2, 3, specifically orthogonally to them.

With the differential 200, the brake element BE can be implemented the same way as with the differential 100 in FIGS. 1 and 2. Therefore, integral parts with regard to the brake element BE have the same reference signs as with the differential 100 according to FIGS. 1 and 2. Consequently, it is referred to the description of FIGS. 1 and 2.

Figure 4:
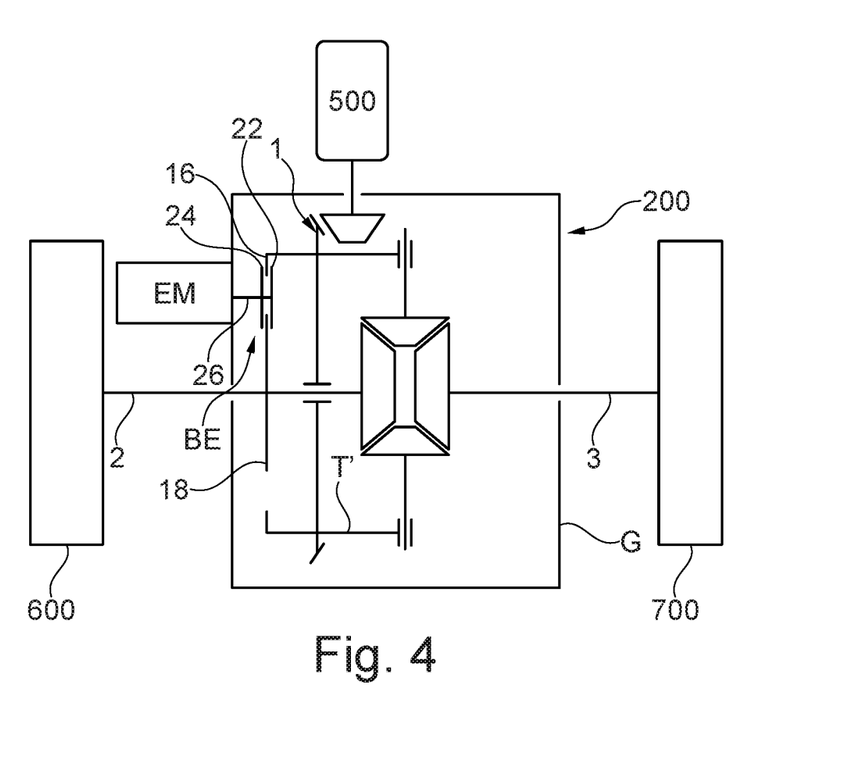

In FIG. 3, the brake element BE is in an open position. FIG. 4 shows the drive train with the differential 200 in the state, where the brake element BE is in a closed position, i.e. the parking brake was activated and the electromotive drive EM was actuated.

Figure 5:
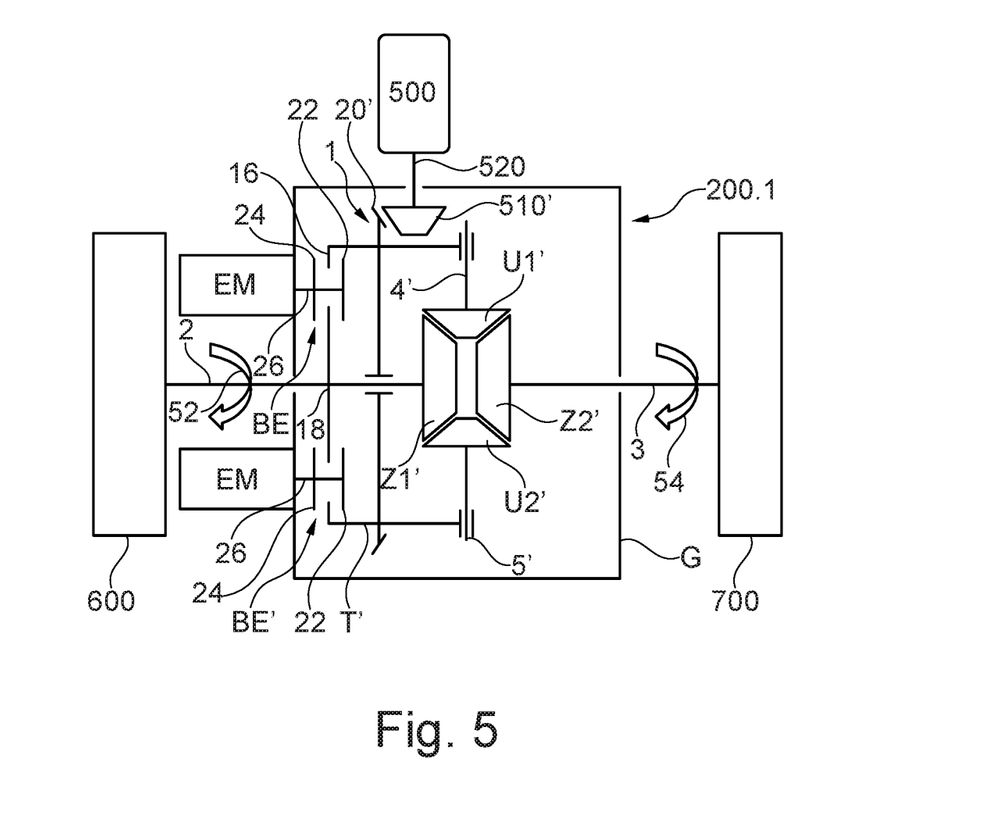

FIG. 5 shows another additional possible embodiment of a differential 200.1 with the example of the drive train, as it was already explained in FIGS. 1 to 4 above. The differential 200.1 has a rotary transmission, which is configured a s a bevel-gear transmission and, consequently, structurally identical to the rotary transmission of the differential 200 in FIGS. 3 and 4. Integral parts of the differential 200.1, which are identical in structure and function with integral parts of the differential 200, can have the same reference signs. Consequently, it is referred to the description of the differential 200 in FIGS. 3 and 4.

With the differential 200.1, an additional brake element BE' is provided aside from the brake element BE, which can be used as a redundancy for the brake element BE additional brake element and/or to increase the braking power. The additional brake element BE' can be configured in the same way as the brake element BE. The additional brake element BE' can be actuated by an additional drive EM', for example, an electromotive drive. Preferably, the brake element BE and the additional brake element BE' form a concendrical configuration with regard to one of the transmission output shafts 2, 3, for example, the transmission output shaft 2. In the same way, the additional drive EM' and the drive EM are to be concentrically allocated with regard to one of the transmission output shafts 2, 3. Preferably, the additional drive EM' is attached to the transmission housing G.

In the description at hand, the reference to a specific aspect or a specific embodiment or a specific configuration means that a specific characteristic or a specific property, which is described in connection with the respective aspect or respective embodiment or the respective configuration, is at least included there, but do not necessarily have to be included in all aspects or embodiments or configurations of the present disclosure. It is explicitly stated that each combination of the different characteristics and/or structures and/or properties, which are described in reference to the present disclosure, are covered by the present disclosure, unless this is explicitly or unequivocally refuted by the context.

The use of individual or all examples or of an exemplary expression in the text shall only illuminate the present disclosure and shall not constitute any restriction with regard to the scope of the present disclosure, if nothing else is claimed. Furthermore, no expression or phrasing of the description shall be understood in such a way that it is an element unclaimed, but essential for the practice of the present disclosure.

The invention claimed is:

1. A differential for an automotive drive, the differential including a transmission housing, a transmission input, two transmission output shafts, and a planetary transmission for distributing performance effective on the transmission output shafts at the transmission input, the planet carrier including at least four transmission elements, of which two transmission elements are configured as a central gear, at least one transmission element as a planetary gear, and a transmission element as a planet carrier, whereby the planet carrier is coupled with the transmission input and one of the central gears each is coupled with one of the transmission output shafts, and at least one planetary gears is engaged with the central gears and is rotatably mounted at the planet carrier and whereby the differential has at least one brake element for a parking brake, which is configured to operatively connect two of the transmission elements to the transmission housing, the differential being configured to operatively connect both of the transmission output shafts to the transmission housing by the brake element.

2. A differential according to claim 1, whereby the brake element is allocated within the transmission housing.

3. A differential according to claim 1, whereby the brake element is a frictionally engaged brake element.

4. A differential according to claim 1, whereby the brake element has at least a friction surface non-rotatably allocated with regard to the transmission housing and both of the transmission elements operatively connectable to the transmission housing each have a counter friction surface, whereby the counter friction surface of the one transmission element is configured at a ring structure and counter friction surface of the other transmission element is configured at a material section allocated within and concentrically to the ring structure.

5. A differential according to claim 1, whereby an electromotive drive, is intended for actuating the brake element, which is fixed to a housing with regard to the transmission housing.

6. A differential according to claim 1, whereby at least one additional brake element is intended, which is configured to operatively connect two transmission elements to the transmission housing and used as redundancy for the brake element and to increase the braking power.

7. A differential according to claim 1, whereby the differential is a spur gear differential with two planetary gears, which are operatively connected to a common shaft rotatably mounted to the planet carrier and allocated parallel to the axle with regard to one of the transmission output shafts, whereby one of the planetary gears meshes with one of the central gears and the other planetary gear is operatively connected with the other central gear with the interposition of an intermediate gear.

8. A differential according claim 1, whereby the differential is a spur gear differential with two planetary gears, which are each operatively connected to a separate shaft rotatably mounted to the planet carrier and allocated transversely to one of the transmission output shafts, whereby each of the planetary gears meshes with one of the central gears.

9. A differential according to claim 1, whereby the differential is an axle differential for a motorized vehicle.

* * * * *